(12) United States Patent
Shingu et al.

(10) Patent No.: US 8,581,993 B2
(45) Date of Patent: Nov. 12, 2013

(54) INFORMATION PROCESSING DEVICE AND COMPUTER READABLE RECORDING MEDIUM

(75) Inventors: Jun Shingu, Kanagawa (JP); Katsura Sakai, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 176 days.

(21) Appl. No.: 13/211,064

(22) Filed: Aug. 16, 2011

(65) Prior Publication Data

US 2011/0298703 A1 Dec. 8, 2011

Related U.S. Application Data

(62) Division of application No. 12/044,009, filed on Mar. 7, 2008, now Pat. No. 8,022,997.

(30) Foreign Application Priority Data

Apr. 19, 2007 (JP) .................................. 2007-111067
Sep. 12, 2007 (JP) .................................. 2007-237158

(51) Int. Cl.
*H04N 5/228* (2006.01)
*H04N 5/232* (2006.01)
*H04N 9/76* (2006.01)
*G03B 21/00* (2006.01)
*G09G 5/00* (2006.01)
*G09B 25/00* (2006.01)
*G09B 29/00* (2006.01)

(52) U.S. Cl.
USPC .............. 348/208.4; 348/208.14; 348/211.99; 348/589; 353/122; 345/625; 434/428; 434/430

(58) Field of Classification Search
USPC ......... 348/208.4, 208.14, 169–172, 589, 600; 434/428, 430
See application file for complete search history.

(56) References Cited

U.S. PATENT DOCUMENTS 5,239,373 A * 8/1993 Tang et al. ................. 348/14.01
5,528,263 A * 6/1996 Platzker et al. ............... 345/156
6,005,482 A * 12/1999 Moran et al. ............... 340/568.8
(Continued)

FOREIGN PATENT DOCUMENTS

JP 2003-330612 A 11/2003
JP 2005-33756 A 2/2005
(Continued)

OTHER PUBLICATIONS

Japanese Office Action based on Japanese Patent Application No. 2007-237158 dated Feb. 15, 2011.

*Primary Examiner* — Sinh Tran
*Assistant Examiner* — Christopher K Peterson
(74) *Attorney, Agent, or Firm* — Sughrue Mion, PLLC

(57) ABSTRACT

An information processing device that is connected to a projecting device that projects an annotation image input from an external, terminal a projection area including an object and a background, and is connected to an image capture device that captures an image of the projection area including the object and the background, includes: a detecting unit that detects movement of the object from an image captured by the image capture device; an extracting unit that extracts a changed region that is caused in the captured image by the movement of the object; and a processing unit that performs processing on at least one of the captured image and the annotation image, when the annotation image exists in the changed region.

4 Claims, 15 Drawing Sheets

(56) References Cited

U.S. PATENT DOCUMENTS

| | | | |
|---|---|---|---|
| 6,326,946 B1 * | 12/2001 | Moran et al. | 345/156 |
| 2002/0130979 A1 * | 9/2002 | Kitaguchi et al. | 348/744 |
| 2004/0070674 A1 | 4/2004 | Foote et al. | |
| 2004/0095314 A1 * | 5/2004 | Nakagawa et al. | 345/156 |
| 2005/0273700 A1 * | 12/2005 | Champion et al. | 715/512 |
| 2006/0197756 A1 * | 9/2006 | Sun | 345/179 |
| 2007/0177013 A1 | 8/2007 | Shingu | |

FOREIGN PATENT DOCUMENTS

| | | |
|---|---|---|
| JP | 2006-252036 A | 9/2006 |
| JP | 2006-352497 A | 12/2006 |
| JP | 2007-208741 A | 8/2007 |

\* cited by examiner 8a
8b
9
12

SMALL REGIONS IN WHICH THE
OBJECT HAS BEEN MOVED

FIG. 15

| ID | STORAGE DATE | IMPORTANCE LEVEL | FILE NAME |
|---|---|---|---|
| 1 | 2007/1/28 19:00 | 0.7 | 0001.jpg |
| 2 | 2007/1/28 19:10 | 0.3 | 0002.jpg |
| ⋮ | ⋮ | ⋮ | ⋮ |

INFORMATION PROCESSING DEVICE AND COMPUTER READABLE RECORDING MEDIUM

CROSS-REFERENCE TO RELATED APPLICATION

This application is a divisional of U.S. patent application Ser. No. 12/044,009 filed Mar. 7, 2008, which is based upon and claims the benefit of priority from Japanese Patent Application No. 2007-111067, filed Apr. 19, 2007, and Japanese Patent Application No. 2007-237158 filed Sep. 12, 2007, the contents of all of which are incorporated herein by reference in their entirety.

BACKGROUND

1. Technical Field

The present invention relates to an information processing device and a computer readable recording medium.

2. Related Art

There have been known remote indication systems, each of the remote indication systems including a server (a computer, for example) connected to a video camera and a projector, and a remote client (a computer, for example) connected to the server via a network.

SUMMARY

According to an aspect of the invention, there is provided an information processing device that is connected to a projecting device that projects an annotation image input from an external terminal onto a projection area including an object and a background, and is connected to an image capture device that captures an image of the projection area including the object and the background. This information processing device includes: a detecting unit that detects movement of the object from an image captured by the image capture device; an extracting unit that extracts a changed region that is caused in the captured image by the movement of the object; and a processing unit that performs processing on at least one of the captured image and the annotation image, when the annotation image exists in the changed region.

BRIEF DESCRIPTION OF THE DRAWINGS

Exemplary embodiments of the present invention will be described in detail based on the following figures, wherein:

FIG. 15 shows an example of a table to be used for controlling data.

DETAILED DESCRIPTION

The following is a description of exemplary embodiments of the present invention, with reference to the accompanying drawings.

First Exemplary Embodiment

Figure 1:
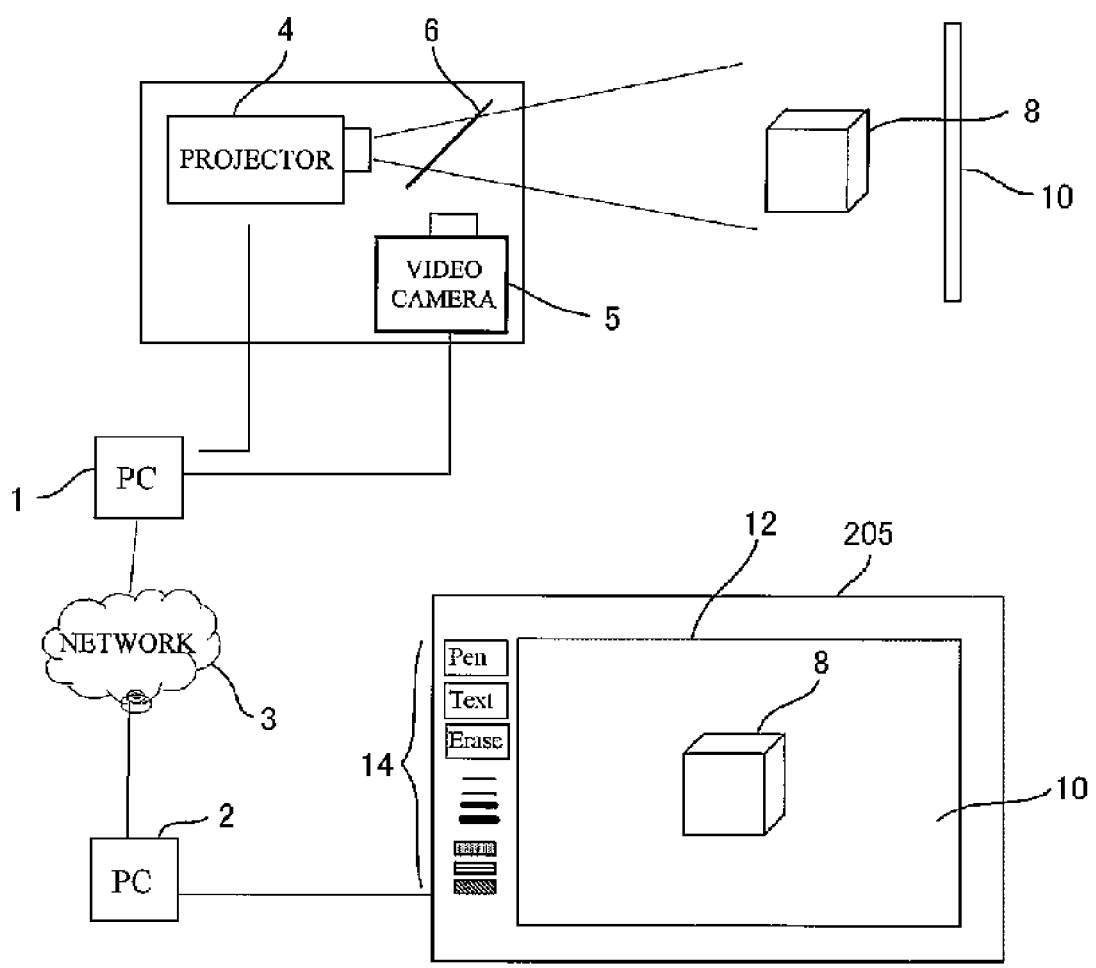
FIG. 1 illustrates the structure of a remote indication system that includes an information processing device in accordance with an exemplary embodiment of the present invention.

FIG. 1 illustrates the structure of a remote instruction system that includes an information processing device in accordance with an exemplary embodiment of the present invention.

The remote indication system of FIG. 1 includes a personal computer (PC) 1 (the information processing device) that functions as a server, and a PC 2 (an external terminal) that functions as a client. The PC 1 and the PC 2 are connected to each other via a network 3. A projector 4 (a projecting device) and a video camera 5 (an image capture device) are connected to the PC 1. In accordance with a control command from the PC 1, light beams are emitted or an annotation image is projected onto an object 8 and a screen 10 via a half mirror 6. Annotation images may be images that include various forms of images such as lines, characters, symbols, figures, colors, and fonts.

The video camera 5 captures a reflected image of the screen 10 as well as the object 8 via the half mirror 6, and outputs the captured image to the PC 1.

The PC 1 outputs the image captured by the video camera 5 to the PC 2 via the network 3. The PC 2 is connected to a display 205, and the display 205 displays a captured image display area 12 and a user interface (UI) 14. The PC 2 may be a personal computer that is integrated with the display 205.

The UI 14 includes a group of buttons such as a pen button, a text button, and an erase button, and icons defined by lines and colors. The image captured by the video camera 5 is displayed in the display area 12. In FIG. 1, the image of the screen 10 including the object 8 that is captured by the video camera 5 is displayed in the display area 12.

For example, when the pen button of the UI 14 is pressed to draw a figure or the like on the object 8 in the display area 12, the information about the figure (specifically, the coordinates (x, y) representing the figure in the display area 12) is output from the PC 2 to the PC 1. The PC 1 then converts the figure information to the information represented by the coordinates of the projector 4, and outputs the coordinate information to the projector 4. Based on the converted information about the figure, the projector 4 projects the figure onto the object 8. Since the captured image is displayed in the display area 12 of the display 205, the coordinates (x, y) in the captured image correspond to the coordinates (x, y) in the display area 12.

Meanwhile, the PC 2 outputs control commands to the PC 1, so as to control operations of the projector 4 and the video camera 5 (such as the capture angles and the brightness of images captured by the video camera 5, and the rightness of images projected by the projector 4).

In FIG. 1, the number of clients is only one (the PC 2), but the remote indication system may include two or more clients (PCs). Also, the projector 4 may be connected to the PC 1, and the video camera 5 may be connected to some other PC (not shown). In such a case, each image captured by the video camera 5 is output to the PC 2 via the other PC.

Figure 2:
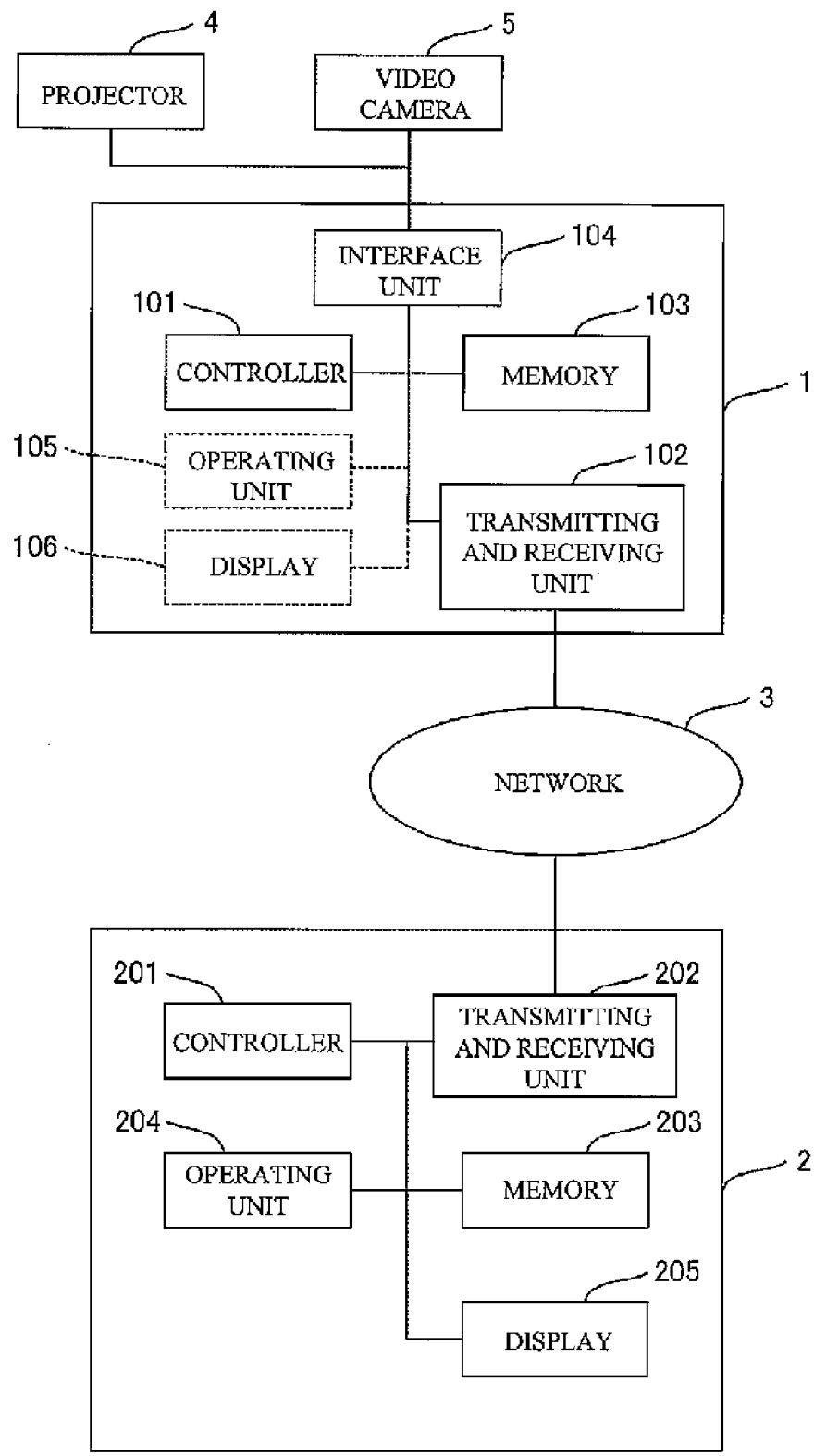
FIG. 2 is a block diagram showing the functional structures of the PC 1 and PC 2.

FIG. 2 is a block diagram showing the functional structures of the PC 1 and the PC 2.

The PC 1 includes: a controller 101 (a detecting unit, an extracting unit, a processing unit, and an acquiring unit) that controls operations of the projector 4, the video camera 5, and a three-dimensional measurement device 7, as well as the entire device; a transmitting and receiving unit 102 (a transmitting unit) that exchanges information with the PC 2 via the network 3); a memory 103 that stores control programs, data, information, and the likes; and an interface unit 104 that connects the projector 4 and the video camera 5. The controller 101 is connected to the transmitting and receiving unit 102, the memory 103, and the interface unit 104. The controller 101 is further connected to the projector 4 and the video camera 5 via the interface unit 104.

The PC 1 may further include an operating unit 105 formed with a mouse, a keyboard, and the likes, and a display 106 that displays a captured image.

The PC 2 includes: a controller 201 that controls the entire device; a transmitting and receiving unit 202 that exchanges information and data with the PC 1 via the network 3; a memory 203 that stores controls programs, data, information, and the likes; an operating unit 204 that is formed with a mouse, a keyboard, and the likes; and a display 205 (an image display). The controller 201 is connected to the transmitting and receiving unit 202, the memory 203, the operating unit 204, and the display 205.

Figure 3:
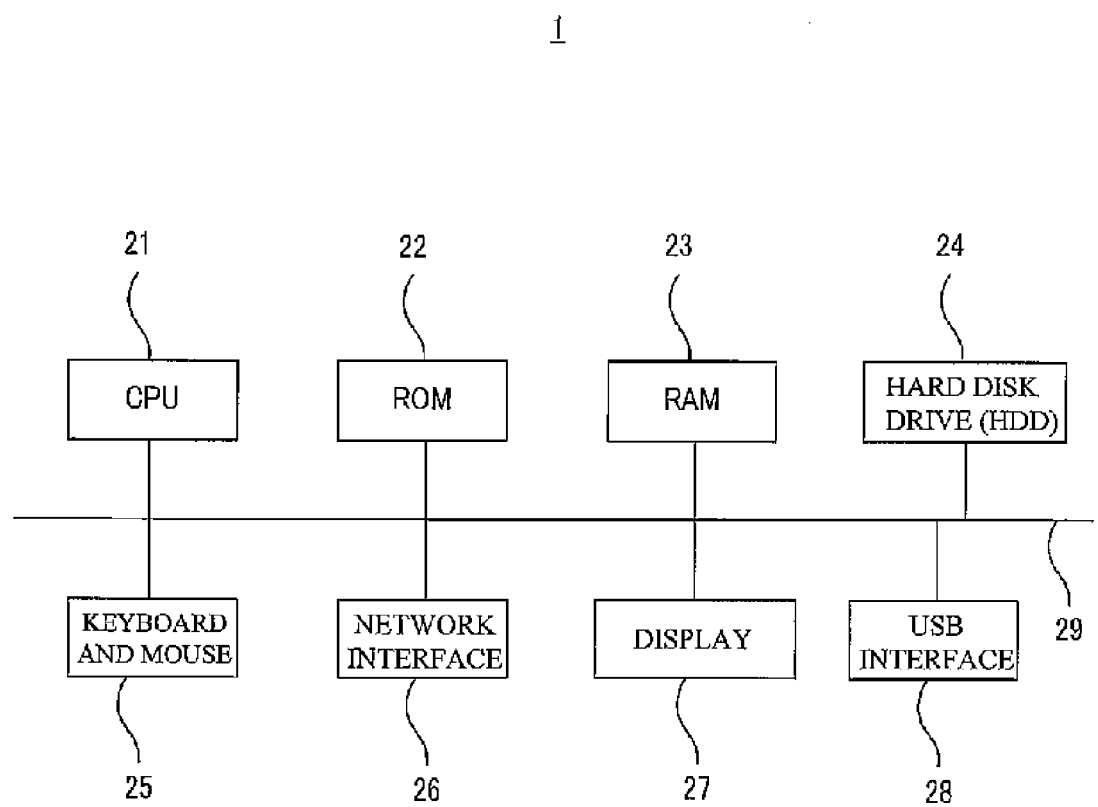
FIG. 3 is a block diagram showing the hardware structure of the PC 1.

FIG. 3 is a block diagram showing the hardware structure of the PC 1.

The PC 1 includes: a CPU 21 that controls the entire device; a ROM 22 that stores control programs; a RAM 22 that functions as a working area; a hard disk drive (HDD) 24 that stores various kinds of information and programs; a mouse and keyboard 25; a network interface 26 that connects to another computer; a display 27 that is formed with a liquid crystal monitor or a CRT; and a USB (universal serial bus) interface 28 that connects to a USB device (not shown). The CPU 21 is connected to the ROM 22, the RAM 23, the hard disk drive (HDD) 24, the mouse and keyboard 25, the network interface 26, the display 27, and the USB interface 28 via a system bus 29.

The controller 101 is equivalent to the CPU 21 that performs various kinds of operations in accordance with control programs. The transmitting and receiving unit 102 is equivalent to the network interface 26, and the memory 103 is equivalent to the hard disk drive (HDD) 24. The interface unit 104 is equivalent to the USB interface 28. The operating unit 105 is equivalent to the mouse and keyboard 25, and the display 106 is equivalent to the display 27.

Like the PC 1, the PC 2 has the structure illustrated in FIG. 3.

Figure 4:
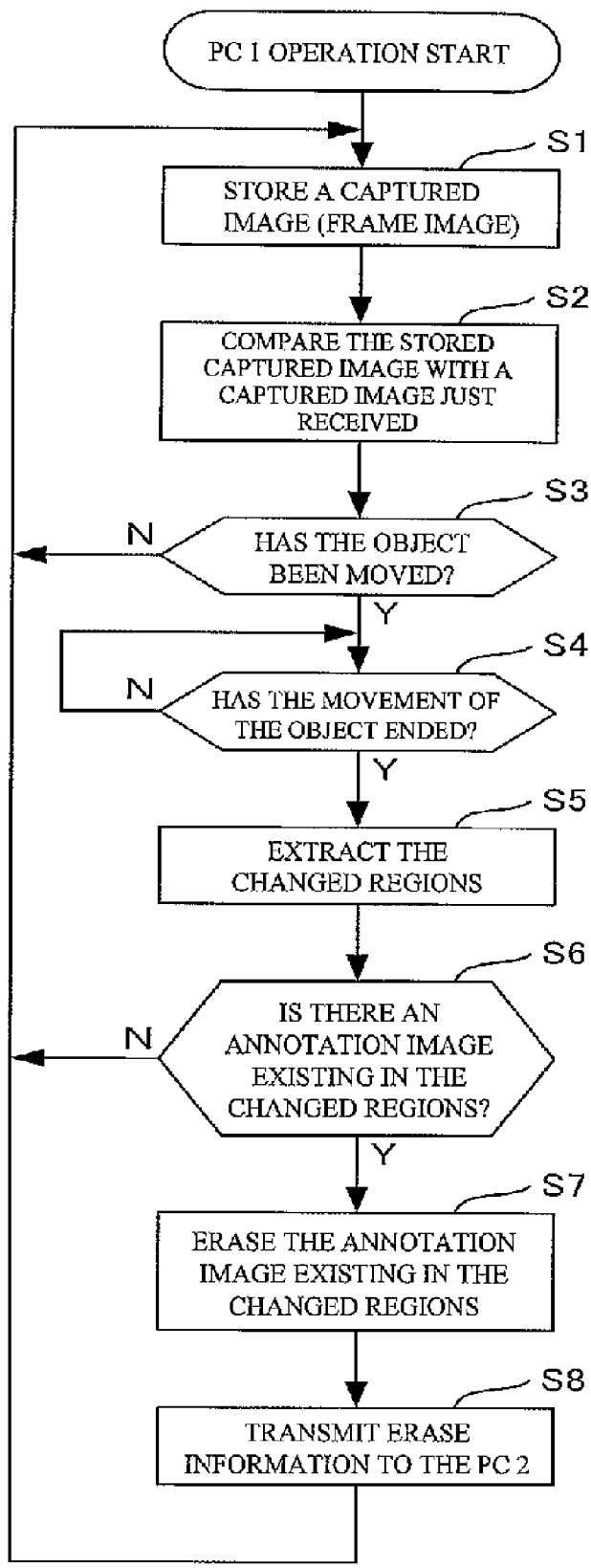
FIG. 4 is a flowchart showing an operation to be performed by the PC 1.

FIG. 4 is a flowchart showing an operation to be performed by the PC 1.

The controller 101 of the PC 1 receives a captured image from the video camera 5, and stores the captured image in the memory 103 (step S1). This captured image is sent as a frame image from the video camera 5 every 0.5 seconds, for example.

The controller 101 compares each pixel of the captured image stored in the memory 103 with each corresponding pixel of a captured image just received from the video camera 5 (step S2). More specifically, the controller 101 compares each pixel of a frame image just received from the video camera 5 with each corresponding pixel of a frame image that was stored in the memory 103 immediately before the reception from the video camera 5.

Based on the result of the comparison in step S2, the controller 101 determines whether the object 8 has been moved (step S3). If there is a difference between the two captured images (frame images), the controller 101 determines that the object 8 has been moved.

The controller 101 does not sense a change in a captured image (frame image) due to a projection of an annotation image. In other words, the controller 101 ignores the difference between frame images before and after a projection of an annotation image. Accordingly, inputs of necessary annotation images can be secured.

The controller 101 then determines whether the movement of the object 8 has been stopped (step S4). For example, if there is not a change in fifty consecutive frame images, the controller 101 determines that the movement of the object 8 has been stopped.

If the result of step S4 is "NO", this determination procedure is repeated. If the result of step S4 is "YES", the controller 101 extracts the changed regions of the captured image (frame image) that has just been received from the video camera 5 (or extracts the regions of the object 8 in the captured image before and after the movement of the object 8) (step S5).

When an annotation image is written in the display area 12 of the display 205, the coordinate information about the annotation image is transmitted from the PC 2 to the PC 1. Based on the coordinate information about the annotation image, the controller 101 may exclude the annotation image region from the region extracted in step S5 of FIG. 4. In this manner, inputs of necessary annotation images can be secured.

Figure 5A:
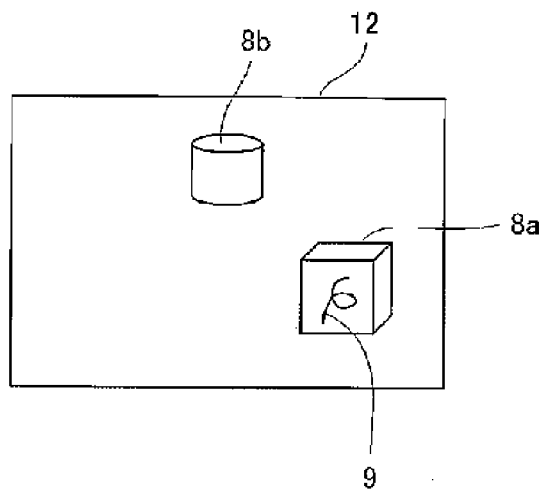
FIG. 5A shows an example of a captured image stored in the memory.
Figure 5B:
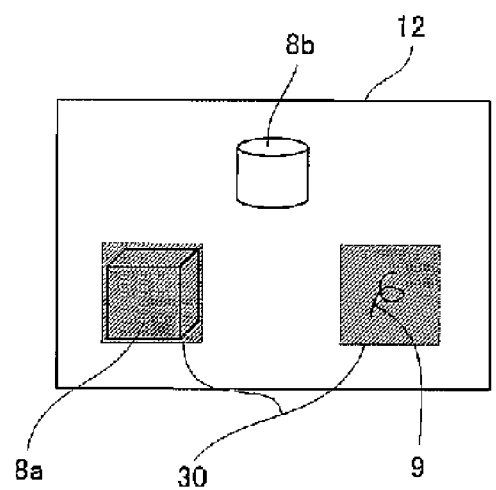
FIG. 5B shows an example of a captured image that has just been received from the video camera.

FIG. 5A shows an example of a captured image stored in the memory 103, and FIG. 5B shows an example of a captured image that has just been received from the video camera 5.

In FIG. 5A, objects 8a and 8b are displayed within the display area 12, and an annotation image 9 is projected onto the object 8a. In FIG. 5B, the object 8a has been moved away from the position shown in FIG. 5A. Reference numeral 30 in FIG. 5B indicates the changed regions, and the changed regions 30 are extracted in step S5. The controller 101 stores the coordinate information about the changed regions 30 on the captured image.

Referring back to FIG. 4, the controller 101 determines whether there is an annotation image in the changed regions 30 (step S6). When an annotation image is written in the display area 12 of the display 205, the coordinate information about the annotation image is transmitted from the PC 2 to the PC 1. Accordingly, the determination in step S6 is performed by the controller 101 determining whether the coordinate information about the changed regions 30 includes the coordinate information about an annotation image.

If the result of step S6 is "NO", the operation returns to step S1. If the result of step S6 is "YES", the controller 101 erases the annotation image in the changed regions 30 from the captured image (step S7). Having received the coordinate information about the annotation image from the PC 2, the controller 101 can erase the annotation image in the changed regions 30 from the captured image by discarding the coordinate information about the annotation image or not outputting the coordinate information about the annotation image to the projector 4.

Figure 5C:
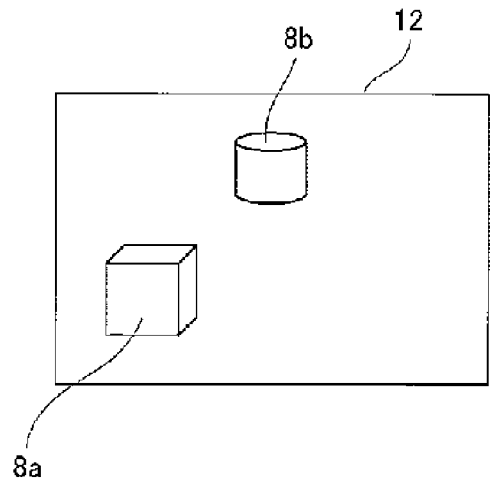
FIG. 5C shows an example of a captured image from which an annotation image has been deleted.

After that, the controller 101 transmits the coordinate information about the annotation image to be erased to the PC 2 (step S8), and returns to step S1. The controller 201 of the PC 2 receives, from the PC 1, the coordinate information about the annotation image to be erased, and then erases the annotation image from the display area 12. FIG. 5C shows an example of the captured image observed after the annotation image 9 is deleted.

In step S7, an annotation image existing in the changed regions 30 is erased from the captured image. However, in a case where a part of an annotation image exists in the changed regions 30, the controller 101 may also erase the annotation image, because such an annotation image does not serve its purpose after the object moves to a different position.

The controller 101 may also erase an annotation image that exists within an area expanded from the changed regions 30 by a predetermined distance (for example, an area expanded vertically and horizontally from the changed regions 30 by thirty pixels). Even if a change in the captured image is not detected with the light projecting an annotation image, the unnecessary annotation image can be erased.

Figure 6A:
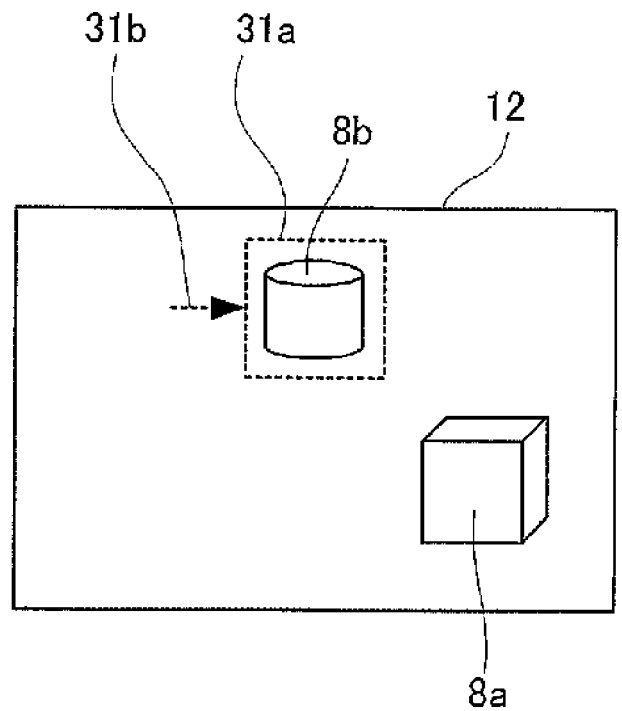
FIG. 6A shows an example of a captured image in which two annotation images are regarded as one group.

In a case where two or more annotation images are regarded as one group and at least one of the annotation images is to be erased, the controller 101 may erase the other annotation images belonging to the same group. In this manner, two or more annotation images can be erased at once, and the operation load on users can be reduced. For example, in a case where annotation images 31a and 31b are regarded as one group, as shown in FIG. 6A, the controller 101 erases the annotation image 31b when erasing the annotation image 31a. The annotation images belonging to the same group are annotation images that are written in the display area 12 within a certain period of time, annotation images that are written within a certain distance range, or annotation images that are written within a certain distance range within a certain period of time.

Figure 6B:
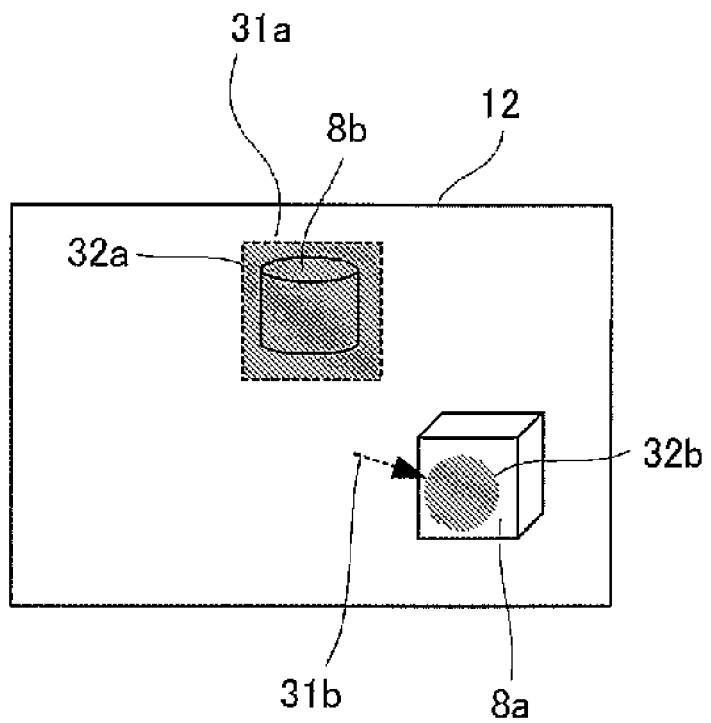
FIG. 6B shows an example of a captured image including annotation images and regions associated with the annotation images.

Further, each annotation image may be associated with a predetermined region. In such a case, when an annotation image is written in the display area 12 of the display 205, the coordinate information about the annotation image and the coordinate information about the region associated with the annotation image are transmitted from the PC 2 to the PC 1. The controller 101 then receives the coordinate information about the annotation image and the coordinate information about the region associated with the annotation image through the transmitting and receiving unit 102. For example, the rectangular annotation image 31a is associated with its inner region 32a, as shown in FIG. 6B. The annotation image 31b, which is an arrow, is associated with a circular region 32b located at the top end of the arrow, also as shown in FIG. 6B. If the region 32a or the region 32b exists in the changed regions 30, the controller 101 erases the rectangular annotation image 31a or the arrow annotation image 31b.

There are cases where an annotation image does not exist in the changed regions 30, depending on the shape of the annotation image to be deleted. However, in a case where the changed regions 30 includes a region associated with an annotation image, the annotation image can be automatically deleted, and the operation load on the user can be reduced.

As described above, in accordance with this exemplary embodiment, the controller 101 senses movement of the object 8, based on an image captured by the video camera 5. The controller then extracts the changed regions in the captured image caused by the movement of the object 8. If there is an annotation image in the changed regions, the controller 101 erases the annotation image. Accordingly, the annotation image that becomes necessary due to the movement of the object can be automatically deleted, and the operation load on the user can be reduced.

The controller 101 also compares an image captured by the video camera 5 with an image captured immediately after the captured image, so as to detect movement of the object 8. Accordingly, the amount of calculations required for detecting movement of the object 8 can be made smaller than in a case where movement of the object 8 is constantly followed.

Second Exemplary Embodiment

This exemplary embodiment differs from the first exemplary embodiment in that, before erasing an annotation image, the controller 101 causes the display 205 to display an "erase cancel button" so as to confirm the intention of the user.

A remote indication system in accordance with this exemplary embodiment has the same structure as the remote indication system of FIG. 1, and therefore, explanation of it is omitted here.

Figure 7:
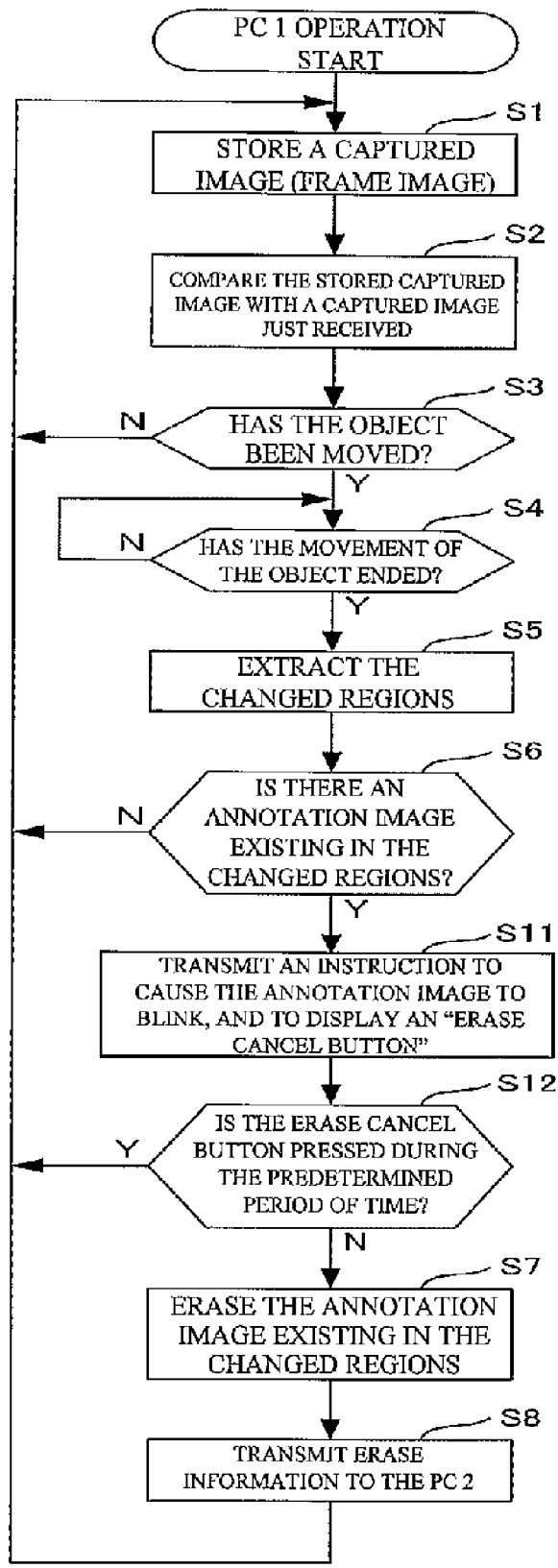
FIG. 7 is a flowchart showing an operation to be performed by the PC 1 in accordance with a second exemplary embodiment.

FIG. 7 is a flowchart showing an operation to be performed by the PC 1. In FIG. 7, the same procedures as those shown in FIG. 4 are denoted by the same step numbers as those in FIG. 4, and explanation of them is omitted here.

If the result of step S6 is "YES", the controller 101 transmits such an instruction to the PC 2 as to blink the annotation image existing in the changed regions 30 and display an erase cancel button (step S11).

Figure 8:
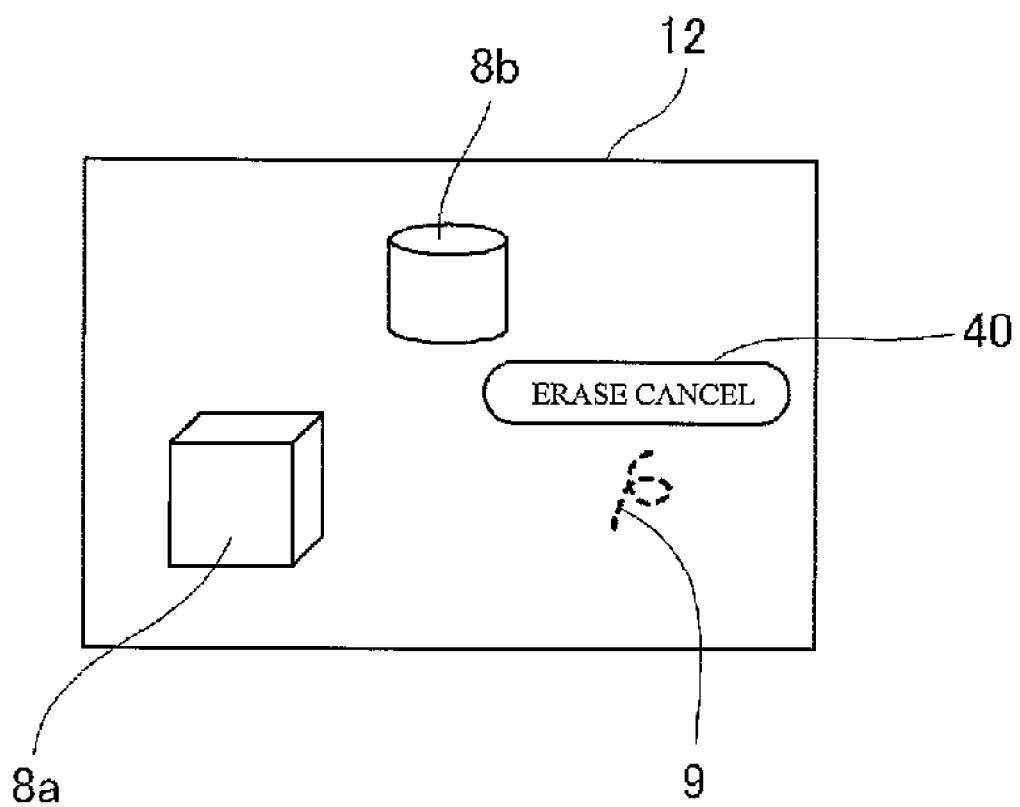
FIG. 8 shows an example of the display area displaying a captured image.

FIG. 8 shows an example of the display area 12 displaying a captured image.

Receiving the instruction to blink the annotation image existing in the changed regions 30 and display an erase cancel button from the PC 1 through the transmitting and receiving unit 202, the controller 201 of the PC 2 causes the display 205 to blink the annotation image and display an erase cancel button. In the example shown in FIG. 8, the annotation image 9 is blinked, and an erase cancel button 40 is displayed in the display area 12. This erase cancel button 40 is displayed for a predetermined period of time (one minute, for example), and automatically vanishes after the predetermined period of time. When a user presses the erase cancel button 40 within the predetermined period of time through the operating unit 204, the controller 201 transmits an erase cancel instruction to the controller 101 of the PC 1 through the transmitting and receiving unit 202.

After carrying out the procedure of step S11, the controller 101 determines whether the erase cancel button is pressed within the predetermined period of time (step S12). If the controller 101 receives an erase cancel instruction from the PC 2 within the predetermined period of time, the controller 101 determines that the erase cancel button is pressed. If the controller 101 does not receive an erase cancel instruction from the PC 2 within the predetermined period of time, the controller 101 determines that the erase cancel button is not pressed.

If the result of step S12 is "YES", the erasing of the annotation image existing in the changed regions 30 is canceled, and the operation returns to step S1. If the result of step S12 is "NO", the operation moves on to step S7, so as to erase the annotation image existing in the changed regions 30 from the captured image.

Although the erase cancel button 40 is displayed on the display 205 in the example shown in FIG. 8, an erase button may be displayed instead. In such a case, when the erase button is pressed, the controller 101 erases the annotation image existing in the changed regions 30.

The controller 101 may handle two or more annotation images as one group, and, when the erase cancel button 40 is pressed, may stop the erasing of all the annotation images belonging to the same group. In such a case, only one erase cancel button 40 is displayed. Alternatively, the controller 101 may handle two or more annotation images blinking within a predetermined period of time as one group. In such a case, the annotation images do not need to start blinking at the same time. Further, the controller 101 may handle two or more annotation images displayed close to one another (only twenty pixels or less apart from one another, for example).

As described above, in accordance with this exemplary embodiment, the display 205 of the PC 2 displays an image captured by the video camera 5, and also displays the erase cancel button 40 for enabling a user to instruct the controller 101 of the PC 1 to cancel erasing of an annotation image being erased, in accordance with the information (the coordinate information) of the annotation image supplied from the PC 1. Accordingly, the user of the PC 2 can instruct the controller 101 to cancel the erasing of the annotation image.

Also, the display 205 blinks an annotation image to be erased for a predetermined period of time, in accordance with the information about the annotation image supplied from the PC 1. Accordingly, the user of the PC 2 can recognize which annotation image is to be erased.

Figure 9:
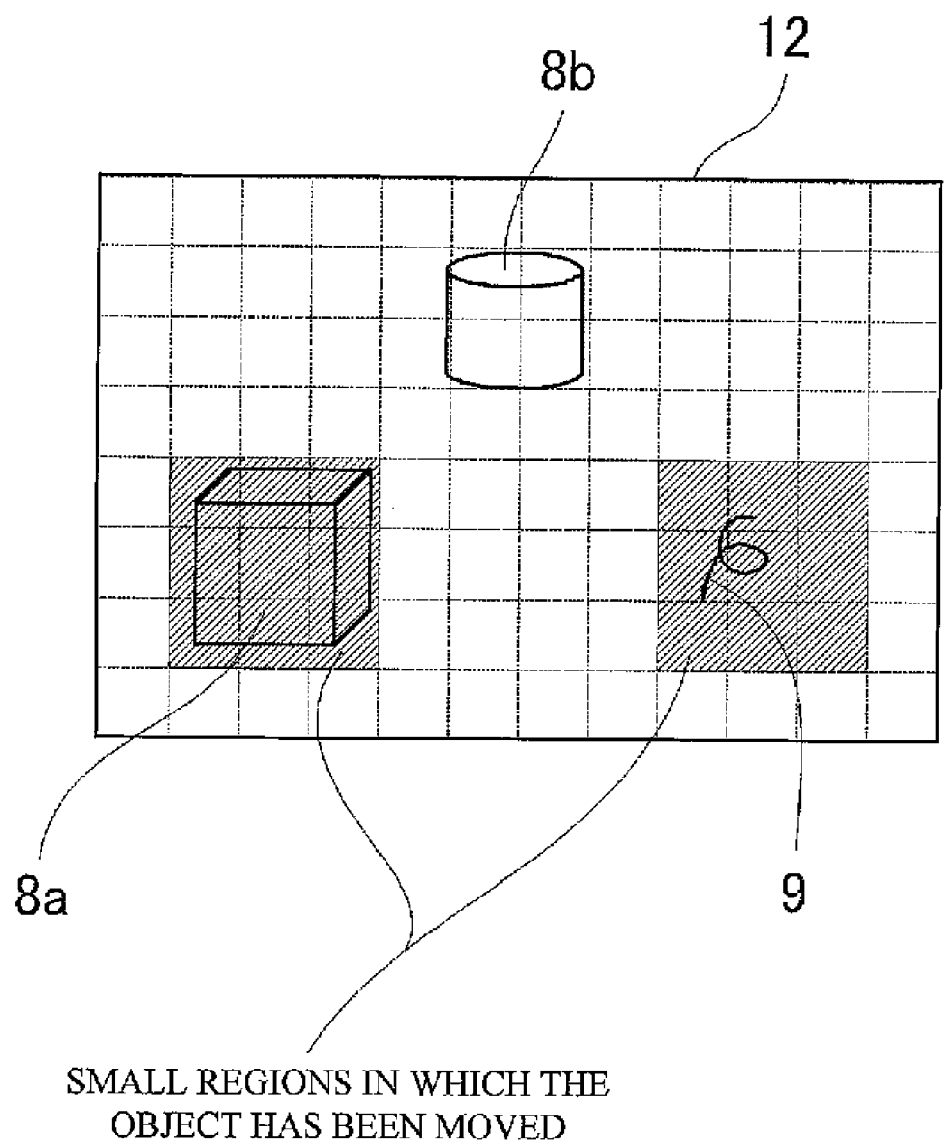
FIG. 9 shows an example of a captured image that is divided into small regions.

In accordance with the first and second exemplary embodiments, the controller 101 compares each pixel of a captured image stored in the memory 103 with each corresponding pixel of a captured image just received from the video camera 5, so as to determine whether the object has been moved (steps S2 and S3). Alternatively, the controller 101 may divide a captured image stored in the memory 103 and a captured image just received from the video camera 5 into small regions, as shown in FIG. 9. The controller 101 then compares each small region of the captured image stored in the memory 103 with each corresponding small region of the captured image that has just been received, so as to determine whether the object has been moved. In this manner, the controller 101 can accurately determine whether the object has been moved, without adverse influence such as noise in the captured images.

Also, the controller 101 may erase an annotation image, when there are changes in a certain number or more of the small regions (five or more small regions, for example) surrounding the annotation image. In this manner, adverse influence such as noise in a captured image can be avoided, and unnecessary annotation images can be erased.

In the first and second exemplary embodiments, the object 8 (8a, 8b) is moved. However, in a case where the projector 4 or the video camera 5 is moved, an entire captured image is the changed region. Therefore, the controller 101 may erase all the annotation images in the captured image in such a case.

Figure 10:
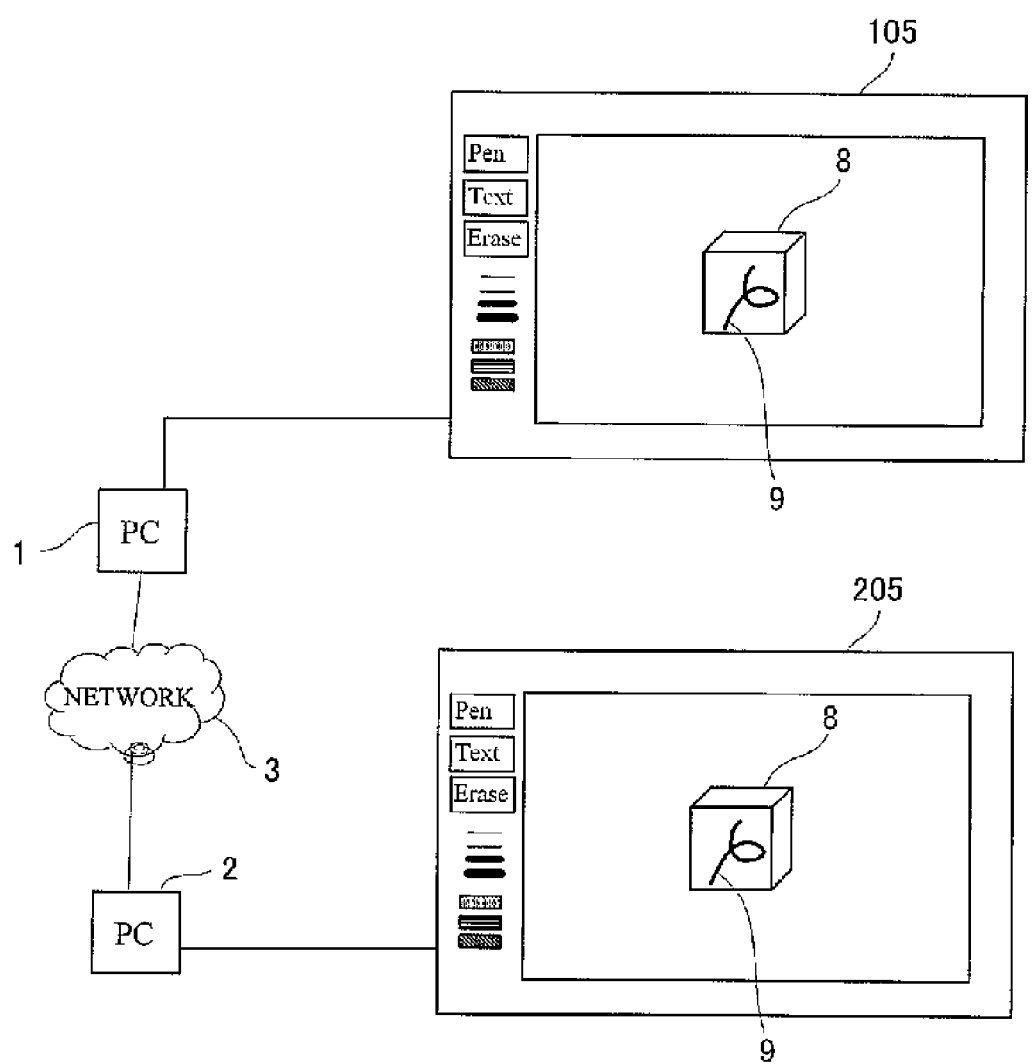
FIG. 10 shows a modification of the remote indication system including the information processing device.

In the first and second exemplary embodiments, the projector 4 and the video camera 5 are connected to the PC 1. However, as shown in FIG. 10, the same object 8 and the same annotation image 9 may be displayed on the display 106 of the PC 1 and the display 205 of the PC 2. In the system shown in FIG. 10, the object 8 is a virtual object. In the system shown in FIG. 10, the PC 1 can also perform the operations shown in the flowcharts of FIGS. 4 and 7.

In such a case, the object 8 and an annotation image that is input from the PC 1 are displayed in the display area of the display 106 of the PC 1. The controller 101 then senses movement of the object 8, extracts the changed regions caused by the movement of the object 8 from the display area, and erases the annotation image if the annotation image exists in the changed regions. In this manner, the annotation image that has become unnecessary due to the movement of the object can be automatically deleted, and the operation load on the user can be reduced.

Third Exemplary Embodiment

Figure 11:
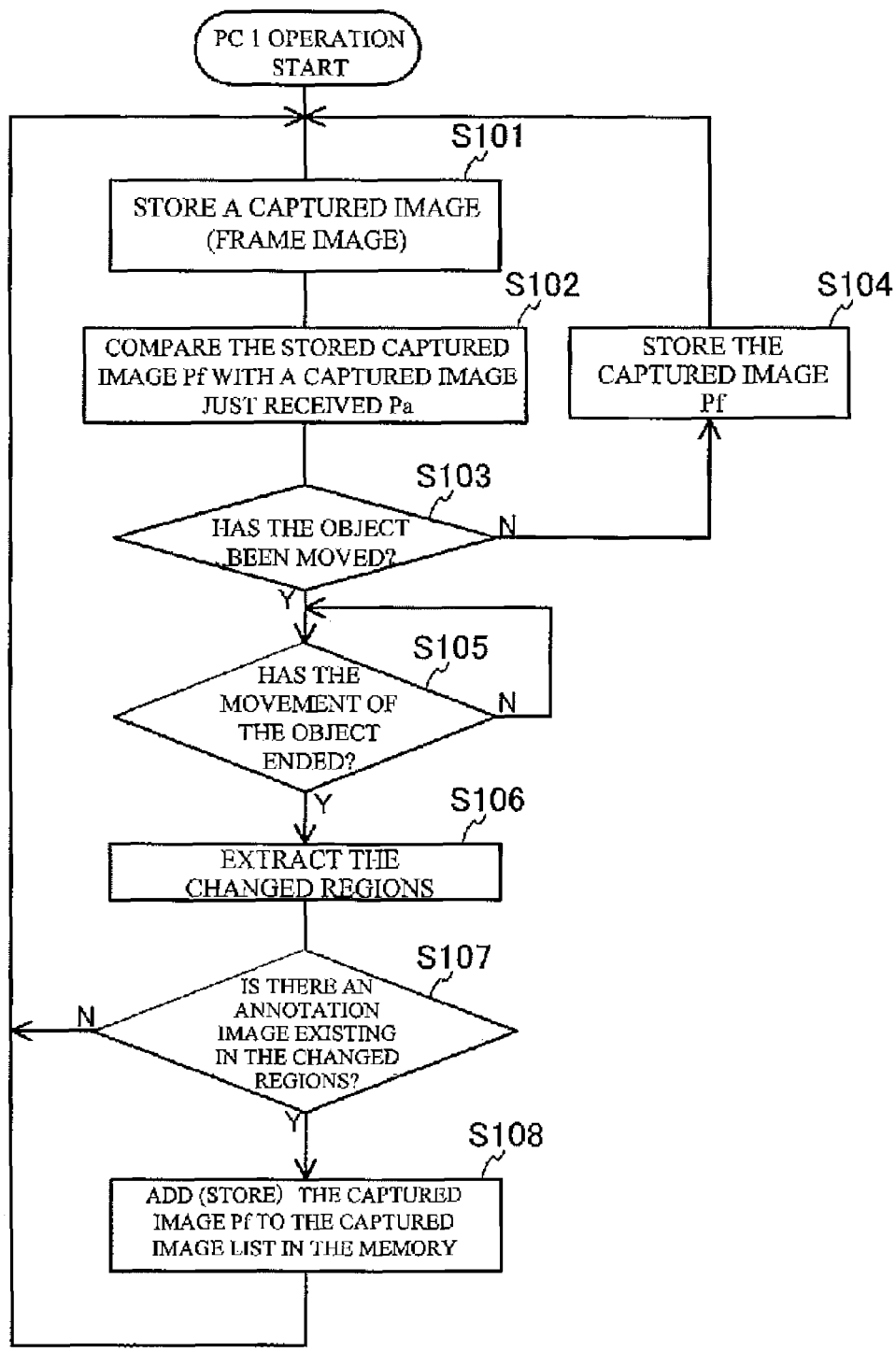
FIG. 11 is a flowchart showing an operation to be performed by the PC 1 in accordance with a third exemplary embodiment of the present invention.
Figure 12A:
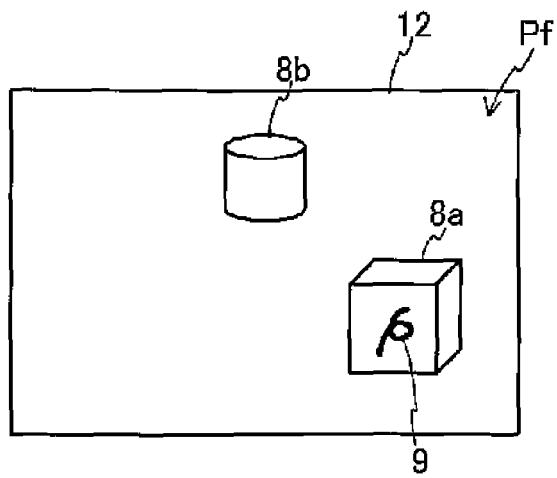
FIG. 12A shows an example of a captured image stored in the memory.
Figure 12B:
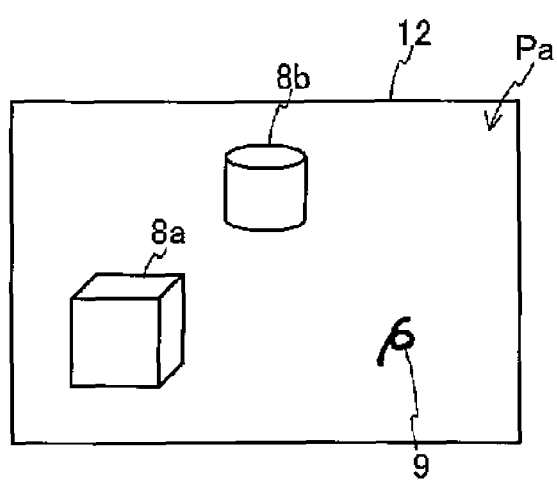
FIG. 12B shows an example of a captured image that has just been received from the video camera.
Figure 12C:
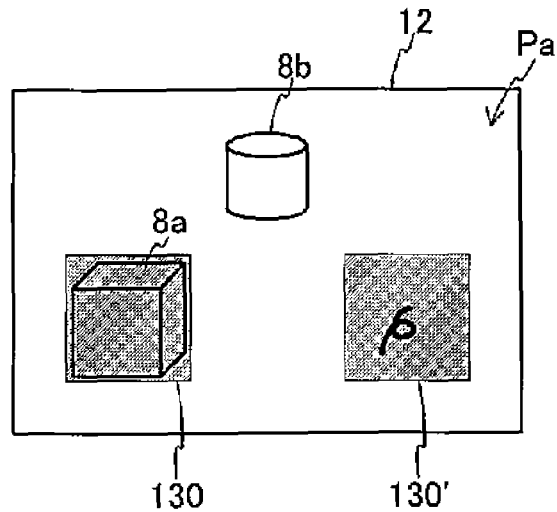
FIG. 12C shows an example of the changed regions.

Referring now to FIGS. 11 through 12C, a third exemplary embodiment of the present invention is described. The third exemplary embodiment is characterized in that, if an annotation image exists in the changed regions of a captured image extracted by the controller 101, the image received immediately before the captured image is stored. A remote indication system in accordance with the third exemplary embodiment has the same structure as the remote indication system of FIG. 1, and therefore, explanation of it is omitted here.

FIG. 11 is a flowchart showing an operation to be performed by the PC 1. As shown in FIG. 11, the controller 101 of the PC 1 receives (obtains) a captured image (hereinafter referred to as the "captured image Pf") from the video camera 5 (step S101). This captured image Pf is sent as a frame image from the video camera 5 every 0.5 seconds, for example.

The controller 101 compares each pixel of the captured image Pf obtained in step S101 with each corresponding pixel of a captured image that has just been received from the video camera 5 (hereinafter referred to as the "captured image Pa") (step S102). More specifically, the controller 101 compares each pixel of a frame image that has just been received from the video camera 5 with the frame image that was stored in the memory 103 immediately before the reception from the video camera 5.

Based on the result of the comparison in step S102, the controller 101 determines whether the object 8 has been moved (step S103). In step S103, if there is a difference between the two captured images (frame images), the controller 101 determines that the object 8 has been moved. The controller 101 does not sense a change in a captured image (frame image) that is caused by a projection of an annotation image. In other words, the controller 101 ignores the difference(s) existing in the annotation image region among the differences between frame images before and after a projection of the annotation image. Accordingly, inputs of necessary annotation images can be secured.

If the determination result of step S103 is negative (the object has not been moved), the captured image Pf is stored in the memory 103 (step S104), and the operation returns to step S101.

If the determination result of step S103 is positive (the object has been moved), the controller 101 determines whether the movement of the object 8 has been stopped (step S105). For example, the controller 101 determines that the movement of the object 8 has been stopped if there is not a change in fifty consecutive frame images.

If the determination result of step S105 is negative, the determination procedure is repeated. When the determination result of step S105 becomes positive, the controller 101 extracts the changed regions in the captured image (frame image) that has just been received from the video camera 5 (step S106).

When an annotation image is written in the display area 12 of the display 205, the coordinate information about the annotation image is transmitted from the PC 2 to the PC 1. Based on the coordinate information about the annotation image, the controller 101 may exclude the annotation image region from the region extracted in step S106 of FIG. 11. In this manner, inputs of necessary annotation images can be secured.

FIG. 12A shows an example case where the objects 8a and 8b are displayed in the display area 12, and an annotation image 9 is projected onto the object 8a (the captured image Pf). FIG. 12B shows an example case where the object 8a has been moved away from the position shown FIG. 12A (the captured image Pa). FIG. 12C shows an example case where the changed regions are extracted (step S106). In FIG. 12C, the regions denoted by reference numerals 130 and 130' are the changed regions. The controller 101 stores the coordinate information about the changed regions 130 and 130' in the captured image.

Referring back to FIG. 11, the controller 101 determines whether there is an annotation image in the changed regions 130 and 130' (step S107). When an annotation image is written in the display area 12 of the display 205, the coordinate information about the annotation image is transmitted from the PC 2 to the PC 1. Accordingly, the determination in step S107 is performed by the controller 101 determining whether the coordinate information about the changed regions 130 and 130' includes the coordinate information about an annotation image.

If the determination result of step S107 is negative, the operation returns to step S101. If the determination result of step S107 is positive, the controller 101 adds (stores) the captured image Pf (the captured image obtained before the movement of the object) to a captured image list in the memory 103 (step S108).

In step S107, if an entire annotation image exists within the changed regions 130 and 130', the captured image Pf is stored. However, it is also possible to store the captured image Pf, if a part of an annotation image exists within the changed regions 130 and 130'.

The controller 101 may also store the captured image Pf, if at least a part of an annotation image exists within an area expanded from the changed regions 130 and 130' by a predetermined distance (for example, an area expanded vertically and horizontally from the changed regions 130 and 130' by thirty pixels). With this arrangement, even if a change in the captured image is not detected with the light projecting an annotation image, the captured image can be stored in appropriate timing.

As the above described procedures and determinations of steps S101 through S108 are sequentially repeated, captured images are accumulated in appropriate timing in the captured image list in the memory 103. Using those accumulated captured images, a user can create the minutes of a conference or the like that is held between remote places with the use of the remote indicating system of this exemplary embodiment.

As described so far, in accordance with the third exemplary embodiment, the controller 101 detects movement of the object 8 from an image captured by the video camera 5, and extracts the change in the captured image that is caused by the movement of the object 8. If there is an annotation image existing in the changed region, the captured image Pf obtained before the change is caused is added (stored) to the captured image list in the memory 103. Accordingly, the captured image can be automatically stored in appropriate timing, and the operation load on the user can be reduced. Also, with the use of captured images stored in appropriate timing, precise conference minutes and the likes can be produced.

In the above described third exemplary embodiment, the captured image Pf is stored in the memory 103. However, it is also possible to store the captured image Pf in another device (PC) that exists within the network and is independent of the PC 1.

Fourth Exemplary Embodiment

Figure 13:
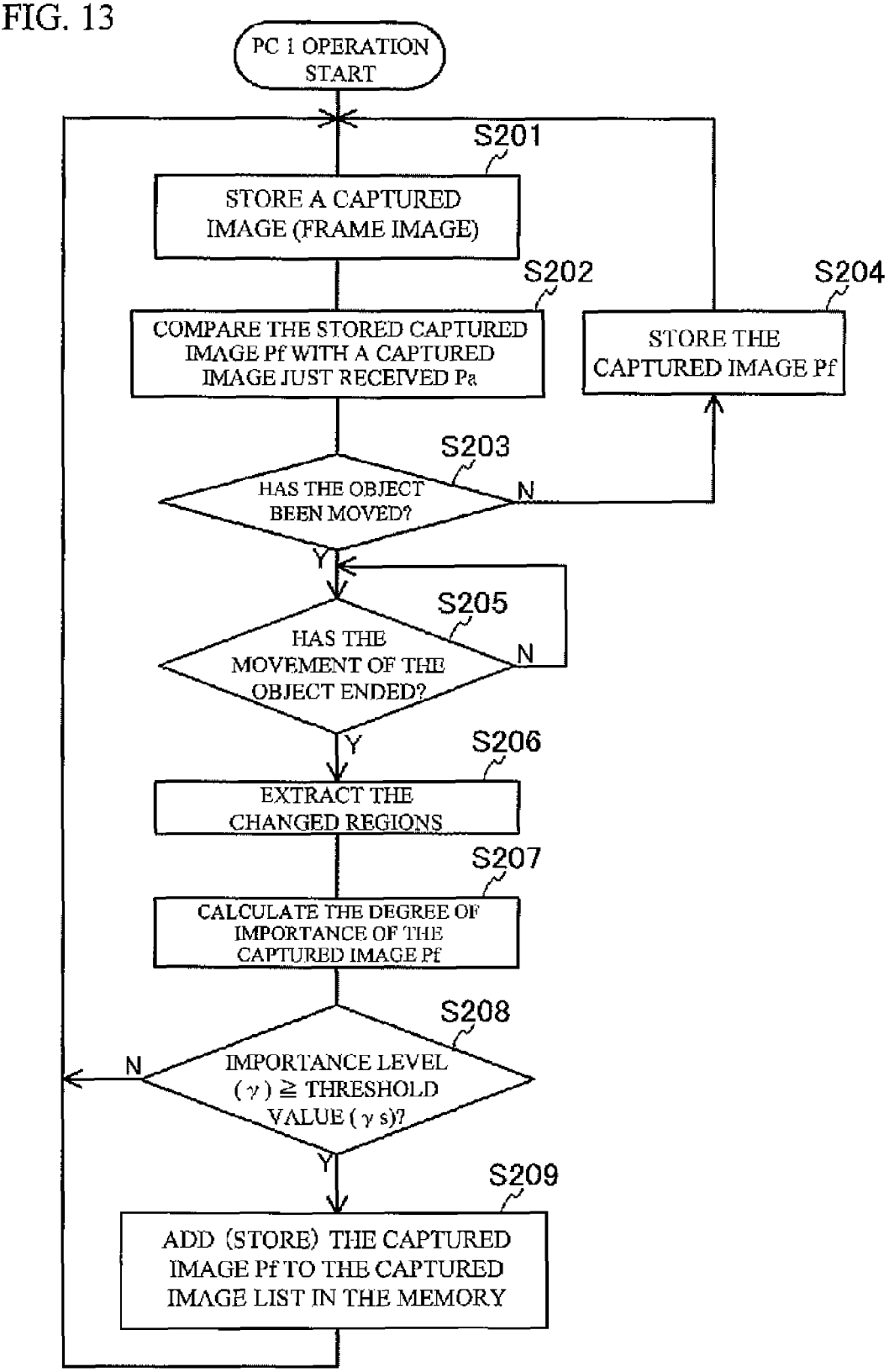
FIG. 13 is a flowchart showing an operation to be performed by the PC 1 in accordance with a fourth exemplary embodiment of the present invention.
Figure 14A:
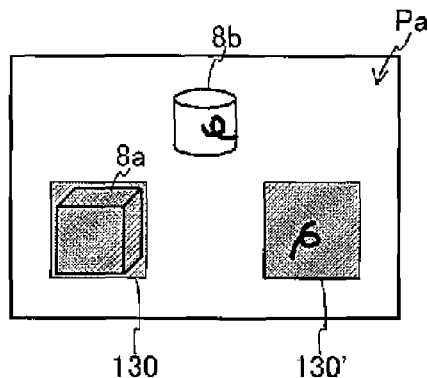
FIGS. 14A through 14F illustrate the degrees of importance.
Figure 14B:
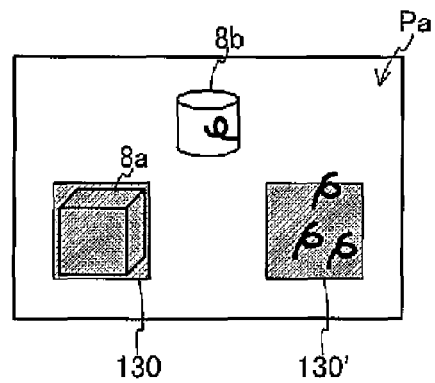
Figure 14C:
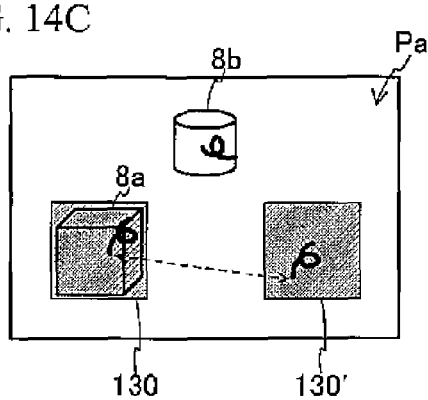
Figure 14D:
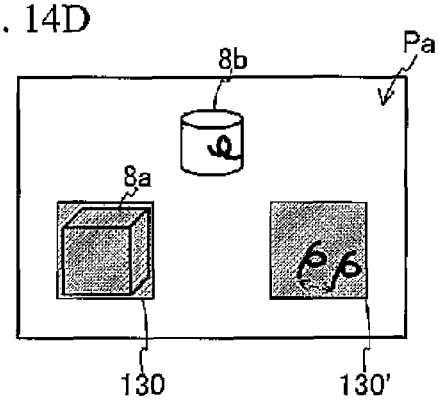
Figure 14E:
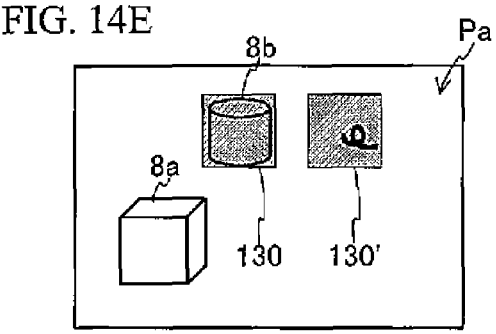
Figure 14F:
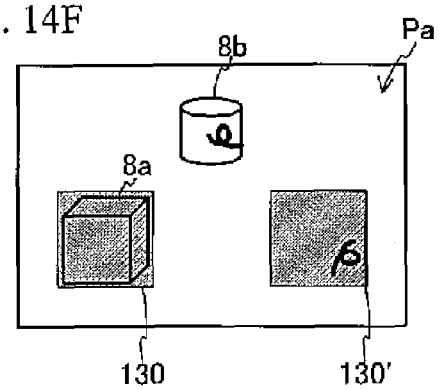

Referring now to FIGS. 13 through 14F, a fourth exemplary embodiment of the present invention is described. This fourth exemplary embodiment differs from the third exemplary embodiment in how a captured image is stored when there is an annotation image existing in the changed regions of the captured image extracted by the controller 101. Therefore, the following is a description of this aspect.

FIG. 13 is a flowchart showing the operation to be performed by the PC 1. As can be seen from a comparison between FIG. 13 and FIG. 11 (showing the operation in accordance with the third exemplary embodiment), the procedures in steps S201 through S206 of FIG. 13 are the same as the procedures in steps S101 through S106 of FIG. 11. Therefore, explanation of the procedures in steps S201 through S206 is omitted here.

After extracting the changed regions in step S206, the controller 101 calculates the degree of importance of the captured image Pf obtained before the change is caused (step S207). In this exemplary embodiment, the parameters for determining the degree of importance include parameters related to the changed regions (such as a parameter ($\beta_1$) related to the size of the changed regions and a parameter ($\beta_2$) related to the time lapsed before the change is caused), parameters related to an annotation image existing in the changed regions (such as a parameter ($\beta_{n-2}$) related to the number of annotation images existing in the changed regions, a parameter ($\beta_{n-1}$) related to the distance between annotation images existing in the changed regions, and a parameter ($\beta_n$) related to the time interval between the annotation images).

The degree of importance is now described in greater detail. For example, if the number of annotation images existing in the changed regions 130 and 130' varies as shown in FIGS. 14A and 14B, the importance degree of the captured image Pf having the larger number of annotation images is higher (the level importance of FIG. 14A is lower than the degree of importance of FIG. 14B). If more than one annotation image exists within the changed regions 130 and 130', as shown in FIGS. 14C and 14D, the degree of importance of the captured image Pf having the smaller distance between the annotation images (having the annotation images closer to each other) is higher (the degree of importance of FIG. 14C is smaller than the degree of importance of FIG. 14D). Further, if the size of the changed regions varies as shown in FIGS. 14E and 14F, the degree of importance of the captured image having the larger changed regions is higher (the degree of importance of FIG. 14E is smaller than the degree of importance of FIG. 14F).

Although not shown, there is a case where only a short period of time is required since the previous captured image has been stored till whether the next captured image should be stored is determined, and there also is a case where a long period of time is required. Between the two cases, it is considered that the case requiring the longer period of time involves more intensive discussion about the image. Accordingly, the degree of importance of the captured image Pf is higher, as the required time is longer.

Further, there is a case where the drawing time interval between annotation images is short, and there also is a case where the drawing time interval between annotation images is long. Between the two cases, it is considered that the case having the shorter drawing time interval involves more intensive discussion about the image. Accordingly, the degree of importance of the captured image Pf is higher, as the drawing time interval is shorter.

Using the above described parameters ($\beta_1$ through $\beta_n$) and weighting coefficients ($\alpha_1$ through $\alpha_n$) for weighting those parameters, the controller 101 calculates the importance level ($\gamma$) in accordance with the following equation (1):

$$\gamma = \alpha_1\beta_1 + \alpha_2\beta_2 + \ldots + \alpha_n\beta_n \quad (1)$$

Referring back to FIG. 13, the controller 101 compares the importance level ($\gamma$) calculated in the above described manner with a predetermined importance threshold value ($\gamma$s), so as to determine whether the importance level ($\gamma$) is equal to or higher than the threshold value ($\gamma$s) (step S208).

If the determination result of step S208 is positive, the importance level of the captured image Pf is determined to be relatively high. Accordingly, the controller 101 adds (stores) the image to the captured image list in the memory 103.

If the determination result of step S208 is negative, the importance level of the captured image Pf is determined not to be high. Accordingly, the controller 101 does not store the image, and returns to step S201.

As the above described procedures and determinations of steps S201 through S209 are sequentially repeated, captured images are accumulated in appropriate timing in the captured image list in the memory 103. Using those accumulated captured images, a user can create the minutes of a conference or the like that is held between remote places with the use of the remote indicating system of this exemplary embodiment.

As described so far, in accordance with the fourth exemplary embodiment, the controller 101 detects movement of the object 8 from an image captured by the video camera 5, and extracts the change that is caused in the captured image due to the movement of the object 8. The controller 101 then calculates the importance level ($\gamma$) of the captured image observed before the change is caused, and spontaneously stores the captured image if the importance level ($\gamma$) is equal to or higher than the threshold value ($\gamma$s). Accordingly, only the images having high importance levels can be stored. With the use of those captured image having high importance levels, precise conference minutes and the likes can be produced.

In the above described fourth exemplary embodiment, the importance level calculation is performed with the use of the equation (1). However, the importance level calculation may be performed with the use of some other equation such as a statistical arithmetic expression. For example, standard deviation may be used in such a statistical arithmetic expression. More specifically, using the standard deviation $\delta_n$ of the drawing time intervals of annotation images with respect to all the data about the drawing time intervals of the annotation images, the importance level can be expressed as:

$$\gamma = \alpha_1\delta_1 + \alpha_2\delta_2 + \ldots + \alpha_n\delta_n \quad (2)$$

It is also possible to use some other expression involving standard deviation.

In the fourth exemplary embodiment, a captured image is stored, if the importance level ($\gamma$) of the captured image is equal to or higher than the threshold value ($\gamma$s). However, it is also possible to write the importance level on a table that is created when the captured image is added (stored) to the captured image list in the memory 103 (a table that manages the file names and storage dates), as shown in FIG. 15. With the use of such a table, the user can create conference minutes and the likes, referring to the importance level of each captured image.

Also, in the fourth exemplary embodiment, the controller 101 determines whether the importance level is equal to or higher than the threshold value in step S208 of FIG. 13. However, the controller 101 may not determine whether the importance level is equal to or higher than the threshold value, and may add (store) all the images having the importance levels calculated to the captured image list in the memory 103 as well as the importance level values. In this manner, users can also create precise conference minutes and the lies, referring to the importance level of each captured image.

In the above described third and fourth exemplary embodiments, the controller 101 compares each pixel of a captured image stored in the memory 103 with each corresponding pixel of a captured image that has just been received from the video camera 5, so as to determine whether the object has been moved. However, the controller 101 may divide a captured image stored in the memory 103 and a captured image just received from the video camera 5 into small regions. The controller 101 then compares each small region of the captured image stored in the memory 103 with each corresponding small region of the captured image that has just been received, so as to determine whether the object has been moved (see FIG. 9). In this manner, the controller 101 can accurately determine whether the object has been moved, without adverse influence such as noise in the captured images.

As in the first and second exemplary embodiments, the same object (virtual object) 8 and the same annotation image 9 may be displayed on the display 106 of the PC 1 and the display 205 of the PC 2 in the third and fourth exemplary embodiments, as shown in FIG. 10. In the system shown in FIG. 10, the PC 1 can also perform the operations shown in the flowcharts of FIGS. 11 and 13.

It is also possible to combine the first or second exemplary embodiment and the third or fourth exemplary embodiment. More specifically, when there is an annotation image existing within the changed regions, the controller 101 may store the captured image obtained immediately before the change is caused in the memory 103 (the captured image list), and delete the annotation image existing in the changed regions.

In each of the above described exemplary embodiments, captured images are transmitted from the PC 1 to the PC 2 via a network. However, separate hardware may be provided in the vicinity of the PC 1, and captured images received from the PC 1 may be transmitted from the separate hardware to the PC 2 via a network.

Alternatively, a recording medium having the software program for realizing the functions of the PC 1 and the PC 2 recorded thereon may be provided to each PC, and the CPU of each PC may read and execute the program recorded on the recording medium. In this manner, the same effects as those of the above described exemplary embodiments can also be achieved. The recording medium for supplying the program may be a CD-ROM, a DVD, a SD card, or the like.

Also, the CPU of each PC may execute the software program for realizing the functions of each PC. In this manner, the same effects as those of the above described exemplary embodiments can also be achieved.

It should be understood that the present invention is not limited to the above described exemplary embodiments, and various modifications may be made to them without departing from the scope of the invention.

What is claimed is:

1. An information processing device that is connected to a projecting device that projects an annotation image input from an external terminal onto a projection area in which an object and a background are situated, and is connected to an image capture device that captures a first image of the projection area including the object and the background, the information processing device comprising:

a detecting unit that detects a first position of the object in the first image captured by the image capture device and a second position of the object in a second image including the object and the background captured by the image capture device subsequent to the first image, and determines, based on the detected first position of the object and the detected second position of the object, a first changed region of the second image at the first position in the second image that is different than a first corresponding region of the first image at the first position in the first image and a second changed region of the second image at the second position in the second image that is different than a second corresponding region of the first image at the second position in the first image;

an extracting unit that extracts the first changed region, the first corresponding region, the second changed region, and the second corresponding region; and a processing unit that calculates at least one difference between the first changed region and the first corresponding region and the second changed region and the corresponding region, calculates an importance level of the first image based on the at least one difference, determines whether the importance level exceeds a threshold, and stores the first image in a storage unit if the importance level meets the threshold and discards the first image if the importance level does not meet the threshold.

2. An information processing device comprising:

a display that displays an image of a projection area in which an object is situated and an annotation image is projected;

a detecting unit that detects a first position of the object in a first image including the object and the annotation image and a second position of the object in a second image including the object and the annotation image captured subsequent to the first image, and determines, based on the detected first position of the object and the detected second position of the object, a first changed region of the second image at the first position in the second image that is different than a first corresponding region of the first image at the first position in the first image and a second changed region of the second image at the second position in the second image that is different than a second corresponding region of the first image at the second position in the first image;

an extracting unit that extracts the first changed region, the first corresponding region, the second changed region, and the second corresponding region; and a processing unit that calculates at least one difference between the first changed region and the first corresponding region and the second changed region and the corresponding region, calculates an importance level of the first image based on the at least one difference, determines whether the importance level exceeds a threshold, and stores the first image in a storage unit if the importance level meets the threshold and discards the first image if the importance level does not meet the threshold.

3. A non-transitory computer readable recording medium causing a computer to execute a process for processing information, the computer being connected to a projecting device that projects an annotation image input from an external terminal onto a projection area in which an object and a background are situated, the computer being also connected to an image capture device that captures a first image of the projection area including the object and the background, the process comprising:

detecting a first position of the object in the first image captured by the image capture device and a second position of the object in a second image including the object and the background captured by the image capture device subsequent to the first image;

determining, based on the detected first position of the object and the detected second position of the object, a first changed region of the second image at the first position in the second image that is different than a first corresponding region of the first image at the first position in the first image and a second changed region of the second image at the second position in the second image that is different than a second corresponding region of the first image at the second position in the first image;

extracting the first changed region, the first corresponding region, the second changed region, and the second corresponding region;

calculating at least one difference between the first changed region and the first corresponding region and the second changed region and the corresponding region;

calculating an importance level of the first image based on the at least one difference;

determining whether the importance level exceeds a threshold; and storing the first image in a storage unit if the importance level meets the threshold and discarding the first image if the importance level does not meet the threshold.

4. A non-transitory computer readable recording medium causing a computer to execute a process for processing information, the process comprising:

displaying an image of a projection area in which an object is situated and an annotation image is projected;

detecting a first position of the object in a first image including the object and the annotation image and a second position of the object in a second image including the object and the annotation image captured subsequent to the first image;

determining, based on the detected first position of the object and the detected second position of the object, a first changed region of the second image at the first position in the second image that is different than a first corresponding region of the first image at the first position in the first image and a second changed region of the second image at the second position in the second image that is different than a second corresponding region of the first image at the second position in the first image;

extracting the first changed region, the first corresponding region, the second changed region, and the second corresponding region;

calculating at least one difference between the first changed region and the first corresponding region and the second changed region and the corresponding region;

calculating an importance level of the first image based on the at least one difference:

determining whether the importance level exceeds a threshold; and storing the first image in a storage unit if the importance level meets the threshold and discarding the first image if the importance level does not meet the threshold.

* * * * *